No. 849,075. PATENTED APR. 2, 1907.
F. J. MAIN & R. C. WILDHAGEN.
BAND CUTTER AND FEEDER FOR CORN HUSKERS.
APPLICATION FILED MAY 8, 1905. RENEWED AUG. 14, 1906.
2 SHEETS—SHEET 1.
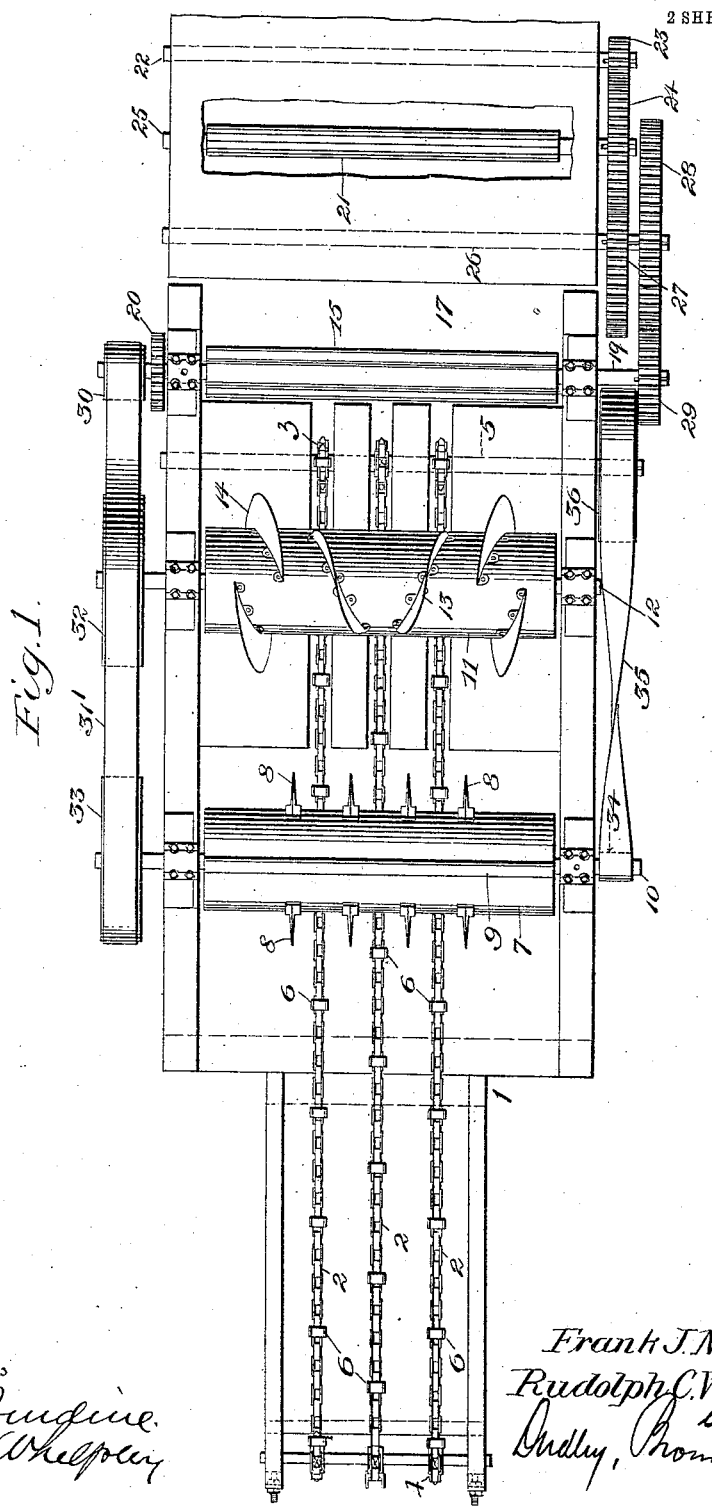

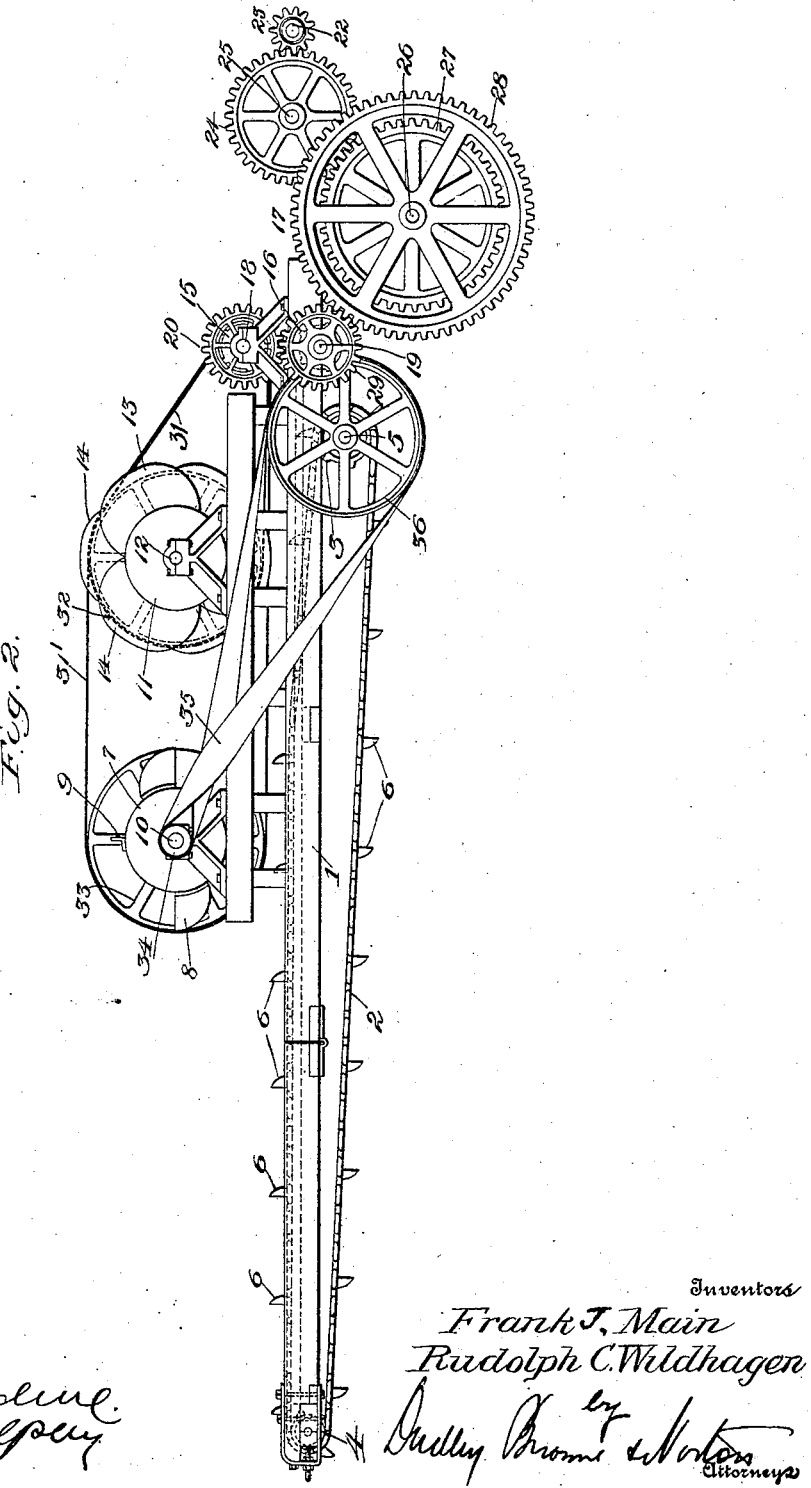

UNITED STATES PATENT OFFICE.

FRANK J. MAIN AND RUDOLPH C. WILDHAGEN, OF MADISON, WISCONSIN.

BAND-CUTTER AND FEEDER FOR CORN-HUSKERS.

No. 849,075.     Specification of Letters Patent.     Patented April 2, 1907.

Application filed May 8, 1905. Renewed August 14, 1906. Serial No. 330,586.

*To all whom it may concern:*

Be it known that we, FRANK J. MAIN and RUDOLPH C. WILDHAGEN, citizens of the United States, residing at Madison, in the county of Dane and State of Wisconsin, have invented certain new and useful Improvements in Band-Cutters and Feeders for Corn-Huskers; and we do hereby declare the following to be a full, clear, and exact description of the invention, such as will enable others skilled in the art to which it appertains to make and use the same.

This invention relates to an improved band-cutting and feeding appliance for employment in connection with corn-husking machines, and has for its objects to dispense with the use of bridging devices at the throat of the husker for supporting the material in its traverse to the snapping-rolls by the provision of means operating to rapidly propel the material across said throat; to obtain a spread or separation of the material in a longitudinal as well as lateral direction, whereby the snapping-rolls may operate in closer relation than hitherto and shelling and mutilation of the ears of corn by said rolls is greatly lessened; to overcome the tendency to congestion of the material at the throat; to minimize the liability to wear, disorder, and breakage, and, together with the expenditure of less power, to increase the capacity both of the feeding appliance and the husking-machine.

Other advantages possessed by the invention are set forth in the following detailed description, in connection with which reference is to be had to the accompanying drawings, illustrating the band-cutting and feeding appliance in its preferred form of embodiment, it being understood that various modifications may be made therein without exceeding the scope of the concluding claims.

In the drawings, Figure 1 is a plan view of a band-cutting and feeding appliance embodying the invention. Fig. 2 is a side elevation of the same.

Referring to the drawings by numerals, 1 designates a horizontally-disposed table, which may be in two foldable sections, as shown. An endless conveyer passes in its upper traverse over the table to feed the material toward the delivery end of the appliance and may consist of three sprocket-chains 2 2 2, passing around sprocket-wheels 3 4, the wheel 3 being fixed on a driven shaft 5. Each of the chains carry material-engaging pins or the like 6 6.

In practice bundles of stalks are deposited singly on the table and are moved by the endless conveyer to and beneath a transversely-disposed roll 7, provided with sets of cutter-blades 8 8, which operate to sever the bands binding the bundles. Between the sets of blades are ribs 9, which coact with the conveyer to move the material. The roll 7 is fixed on a shaft 10, journaled in suitable bearings on side frames, and said roll is set sufficiently close to the table to obtain a flattening of the bundle and a lateral separation or spreading apart of the stalks. From the roll 7 the material passes to and beneath a transversely-disposed roll 11, fixed on a shaft 12 and equipped on its periphery with right and left spiral blades 13 14, operating to further spread or separate the stalks laterally. The spread stalks pass from the spreading-roll 13 to and between feed-rolls 15 16 at the throat 17. These feed-rolls, which may be longitudinally ribbed, as shown, are fixed, respectively, on shafts 18 19, connected by gearing 20. As will presently more fully appear, the feed-rolls are revolved at a relatively high speed to propel the stalks across the throat to the snapping-rolls 21 of the husking-machine, whereby the employment of stalk-supporting devices or the like at said throat is unnecessary. The moving parts of the feeder are preferably driven by gear connection with a shaft on the husking-machine. The drive-shaft 22, which has a relatively very high rotative speed, carries a gear 23 in mesh with a reducing-gear 24 on the shaft 25 of the upper snapping-roll. A shaft 26 adjacent to the snapping-rolls carries two gears, one of which, 27, meshes with the gear 24 and the other, 28, is in mesh with a relatively smaller gear 29 on the shaft 19 of the lower feed-roll 16. The shaft 18 carries a pulley 30, which is connected by belts 31 and 31' with relatively larger pulleys 32 33, respectively carried by the shafts 12 10 of the rolls 13 7. The shaft 10 carries a second pulley 34, which is connected by a cross-belt 35 with a pulley 36 on the sprocket-wheel shaft 5.

In operation a bundle of stalks is deposited on the table and is moved by the conveyer to and beneath the roll 7, where it is flattened and the band is severed by the blades 8. From the roll 7 the bundle passes to and beneath the roll 11, where it is further flattened and is laterally spread or separated by the action of the spiral blades 13 14. The rolls 7 11 have a peripheral speed in excess of that of the conveyer, and the upper stalks are moved relatively faster than the lower stalks, which are engaged by the pins or the like on the conveyer-chains. In the movement of the bundle beneath the rolls 7 11, therefore, the stalks separate both longitudinally and laterally, and by reason of this stringing out the stalks in the bundle do not reach the feed-rolls at the same time. The feed-rolls revolve at a high rate of speed as compared with the speeds of the rolls 7 11 and conveyer, and the stalks which first reach the feed-rolls are drawn through very rapidly and the bundle is thus strung out very thinly and is propelled across the throat to the snapping-rolls. In other words, the corn comes into the feeder as a bundle carried on a slowly-moving conveyer and passes out between the feed-rolls at a high velocity, having lost its identity as a bundle, and becomes a continuous stream of thinly-spread stalks.

One of the difficulties presented in devising an automatic feeder for corn-huskers is to get the stalks across the throat to the snapping-rolls and prevent them from dropping through the throat to the husking-rolls. Usually the throat is bridged by rods or the like, forming supports for the stalks in their slow movement across the throat. Bridging devices are, however, objectionable on account of the expense, but mainly for the reason that they frequently cause bunching of the stalks and congestion. The employment of high-speed rolls dispenses with the necessity of using bridging devices at the throat. Consequently there is no liability to congestion or clogging, and a further advantage possessed by the improved structure is that the snapping-rolls may be operated in closer relation than heretofore, with the result that less opportunity is presented for the ears to be drawn between the rolls. There is therefore much less shelling and mutilation of the ears, and as the snapping-rolls are able to act on the stalks as fast as the latter come from the feed-rolls the husker may be constantly operated at its full capacity. Moreover, by reason of the stated condition of the material in its passage through the feeder and the snapping-rolls there is less liability of stoppage or clogging at any point, and as a consequence less power is required for the operation and all liability to wear, disorder, and breakage both in the feeder and in the husker is reduced to the minimum.

We claim as our invention—

1. In an automatic feeder for corn-huskers, the combination of a table, feeding means including an endless conveyer, a band-cutter, spreading means beyond the band-cutter, a pair of feed-rolls beyond the spreading means, and connections for driving the feed-rolls at a speed to propel the stalks by momentum across the throat of the husker.

2. In an automatic feeder for corn-huskers, the combination of a table, feeding means including an endless conveyer, a band-cutter, a spreading-roll beyond the band-cutter having right and left spiral spreading-blades, a pair of feed-rolls beyond the spreading-roll, and connections for driving the feed-rolls at a speed in excess of the speed of the other moving parts to propel the stalks by momentum across the throat of the husker.

3. In an automatic feeder for corn-huskers, the combination of a table, feeding means including an endless conveyer, a band-cutter, a spreading-roll beyond the band-cutter, a pair of feed-rolls beyond the spreading-roll, connections for driving the spreading-roll at a speed in excess of the speed of the conveyer, and connections for driving the feed-rolls at a speed in excess of the speed of the spreading-roll to propel the stalks by momentum across the throat of the husker.

4. In an automatic feeder for corn-huskers, the combination of a table, feeding means including an endless conveyer, a band-cutting and feed roll, a spreading-roll beyond the first-named roll, a pair of feed-rolls beyond the spreading-roll, connections for driving the band-cutting and feed roll and the spreading-roll at a speed in excess of the speed of the conveyer, and connections for driving the pair of feed-rolls at a speed in excess of the speed of the band-cutting and feed roll and the spreading-roll to propel the stalks by momentum across the throat of the husker.

5. In an automatic feeder for corn-huskers, the combination of a table, feeding means including an endless conveyer, a rotatable band-cutter, a spreading-roll beyond the first-named roll, a pair of feed-rolls beyond the spreading-roll, connections for driving the band-cutting and feed roll and the spreading-roll at a speed in excess of the speed of the conveyer, and connections for driving the pair of feed-rolls at a speed in excess of the speed of the band-cutting and feed roll and the spreading-roll to propel the stalks by momentum across the throat of the husker.

In testimony whereof we affix our signatures in presence of two witnesses.

FRANK J. MAIN.
RUDOLPH C. WILDHAGEN.

Witnesses:
JOHN S. MAIN,
FRANK W. LUCAS.